(12) United States Patent
Jones et al.

(10) Patent No.: US 8,713,526 B2
(45) Date of Patent: *Apr. 29, 2014

(54) ASSIGNING RUNTIME ARTIFACTS TO SOFTWARE COMPONENTS

(75) Inventors: Robert C. Jones, Winchester (GB); Kate Robinson, Winchester (GB); Russell Wilson, Uffculme (GB)

(73) Assignee: International Business Machines Corporation, Armonk, NY (US)

( * ) Notice: Subject to any disclaimer, the term of this patent is extended or adjusted under 35 U.S.C. 154(b) by 61 days.

This patent is subject to a terminal disclaimer.

(21) Appl. No.: 13/405,321

(22) Filed: Feb. 26, 2012

(65) Prior Publication Data

US 2012/0167046 A1    Jun. 28, 2012

Related U.S. Application Data

(63) Continuation of application No. 13/220,152, filed on Aug. 29, 2011.

(30) Foreign Application Priority Data

Sep. 6, 2010   (EP) ..................................... 10175486

(51) Int. Cl.
*G06F 9/44* (2006.01)

(52) U.S. Cl.
USPC ........................................................ 717/121

(58) Field of Classification Search
USPC ........................................................ 717/121
See application file for complete search history.

(56) References Cited

U.S. PATENT DOCUMENTS

| 7,322,024 | B2 * | 1/2008 | Carlson et al. | 717/120 |
| 8,464,214 | B2 * | 6/2013 | Miloushev et al. | 717/108 |
| 2003/0121024 | A1 * | 6/2003 | Hill et al. | 717/107 |
| 2004/0093593 | A1 * | 5/2004 | Jhanwar et al. | 717/169 |
| 2005/0216885 | A1 | 9/2005 | Ireland | |
| 2006/0143597 | A1 * | 6/2006 | Alaluf et al. | 717/136 |
| 2007/0074156 | A1 * | 3/2007 | Nelson et al. | 717/107 |
| 2010/0242015 | A1 * | 9/2010 | Stenberg et al. | 717/106 |

OTHER PUBLICATIONS

IBM, "Method and Apparatus for Packaging Software Components," IP.com No. IPCOM000144121D, Dec. 18, 2006.
IBM, "Attribute-Driven Application/User Settings Using Code Reflection," IP.com No. IPCOM000178351D, Jan. 23, 2009.
Office Action for U.S. Appl. No. 13/220,152 dated Jul. 29, 2013.

* cited by examiner

*Primary Examiner* — Philip Wang
(74) *Attorney, Agent, or Firm* — Winstead, P.C.

(57) ABSTRACT

A method for assigning runtime artifacts to software components. Source code and metadata are extracted from a library, where the metadata includes a component membership for the source code. A compile unit is formed from the extracted source code and metadata. Runtime artifacts are produced from the compile unit or an element derived from the compile unit. Each runtime artifact is interrogated to determine the defined component for each runtime artifact. The determined component is recorded.

5 Claims, 8 Drawing Sheets

ASSIGNING RUNTIME ARTIFACTS TO SOFTWARE COMPONENTS

CROSS-REFERENCE TO RELATED APPLICATIONS

The present application is a continuation application of pending U.S. patent application Ser. No. 13/220,152, which was filed on Aug. 29, 2011, which is assigned to the assignee of the present invention. The present application claims priority benefits to U.S. patent application Ser. No. 13/220,152, which claims priority under 35 U.S.C. §119(a) from European Patent Application No. 10175486.9, filed on Sep. 6, 2010, the contents of which are incorporated herein by reference.

TECHNICAL FIELD

The present invention relates to the field of assigning runtime artifacts to software components, and more particularly, to providing the assignment of individual runtime artifacts to self-defined discrete components.

BACKGROUND

Many software systems are split along functional boundaries into notional components. Diagnostic facilities in such a software system might not have awareness of these functional boundaries, or, if any such awareness exists, then the awareness is static, which requires maintenance as the product evolves. The drawbacks of maintaining a static awareness include the possibility of introducing defects and the creation of repeated development and test efforts. The absence of accurate componentization in a software system increases the time for the resolution of defects, and forces the collection of irrelevant information. Additionally, during rapid software development, there is scope for functional boundaries to change frequently. All of these factors contribute to making the composition of the functional components of software systems during, for example, the creation and the operation of such software systems either too complex to be carried out accurately or require a very significant workload to establish correctly.

BRIEF SUMMARY

In one embodiment of the present invention, a method of assigning runtime artifacts to software components comprises extracting source code and metadata from a library, the metadata comprising a component membership for the source code. The method further comprises forming a compile unit from the extracted source code and metadata. Additionally, the method comprises producing runtime artifacts from the compile unit or an element derived from the compile unit. Furthermore, the method comprises interrogating each runtime artifact to determine a defined component for the each runtime artifact. In addition, the method comprises recording, by a processor, the determined component.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
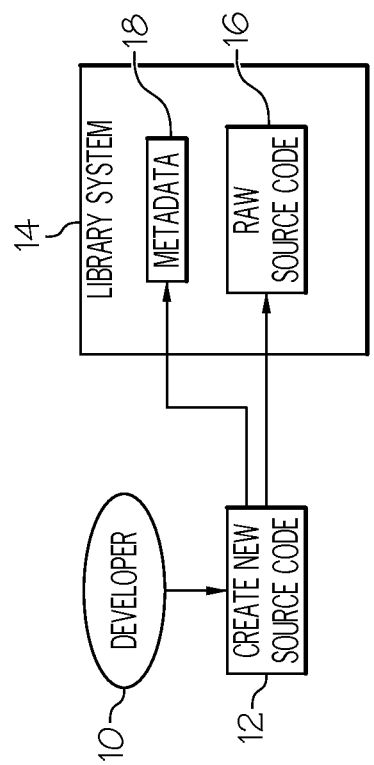
FIG. 1 is a schematic diagram of the creation of source code and associated metadata in accordance with an embodiment of the present invention.

By implementing the principles of the present invention, it is possible to provide a method, computer program product and system in which a software system is able to discover components and assign software elements to those components at runtime. Software elements are mapped to components using a source library control system categorization facility. This allows components to be manipulated by an administrator in a single location and without changing source code. Changes to the categorization in the source library are automatically reflected in the product runtime. Removing the overhead of maintaining componentization logic can improve product serviceability and customer satisfaction while reducing development costs.

During initialization of a software system, the system discovers components and assigns software elements to those components. Once complete, the system can then continue operation utilizing the new components. An example of such a utilization is a diagnostic facility of a software system. Software elements have a well defined method of disclosing their component membership at runtime. The component is not explicitly defined within the source code of the software element, but is set at build time based upon the categorization of the source code. The method allows the software system to query software elements for their component information, which is well defined and consistent throughout the software system. The ability to identify software elements with components can be used to monitor selected system activity, modify behavior or provide targeted diagnostic information.

When source code is created, the developer categorizes the source code to define the component to which the source code belongs. The nature of a "component" is a flexible concept that can be defined according to the nature of the software system being built and/or the end implementation of the software system. The project manager may define only a very small number of components or there may be a very large number of different components or anywhere in-between. The level of granularity in the component concept is flexible in terms of the division of the software system into components. All that is required is that any new source code is categorized as belonging to an existing component. New components can be created and existing components can be split or merged, under the control of the project manager or suitably authorized administrator.

Source files acquire a component as one of the source file properties upon being stored in a source library control system. Source file properties can subsequently be modified at any time. The source code management system provides a facility to automatically substitute pre-defined symbols with concrete values prior to each build. For example, in a Java®-based software system, the use of the Java® Reflection API provides a suitable method for a software system to analyze itself. By reflectively loading each class within the software system, the system queries the concrete value that indicates the component. Once the analysis is complete, the software system is aware of the component to which each class belongs.

In one embodiment, the method further comprises receiving a defined user input relating to the metadata comprising the component membership for the source code, and changing the component membership according to the defined user input, without changing the source code. In one embodiment of the system, the library can be accessed by an administrator who has the authority to change the categorization of any source code within the library, thereby changing the component to which the particular source code has been assigned. This is advantageous, as individual developers who write source code and store the code in the library do not necessarily have a total overview of the software system that is being created. Therefore, the category assignment made by the developer may need to be changed by an administrator, but no changes are made to the actual source code in the library, just to the associated metadata for that specific piece of source code.

Advantageously, the steps of extracting the source code and metadata from the library and forming a compile unit from the extracted source code and metadata are performed as a single process step. The creation of the compile unit from the source code and metadata within the library may be a separate step from the extraction of the source code and metadata or may be combined into a single step. Carrying this out as a single combined action is more efficient.

In one embodiment, the method further comprises transforming the compile unit into an executable form, wherein the element derived from the compile unit which produces the runtime artifacts comprises the executable form. The compile unit that is created from the source code and the metadata may be runnable as is, or may need to be further converted into an executable form before it can be operated within the software system that is being created. The runtime artifacts that are interrogated by the execution environment are produced by the executable form of the compile unit, rather than the compile unit itself.

In one embodiment, the method further comprises, prior to interrogating each runtime artifact, starting an execution environment and creating a component list, wherein the step of recording the determined component comprises recording the component in the component list. The execution environment that is carrying out the interrogation of the runtime artifacts can be used to create a component list at start-up, which can be populated with the determined categories from the interrogated runtime artifacts. This provides an efficient method by which the runtime artifacts that have been created by the software system have their category recorded against the component definitions for the specific software system.

Referring now to the Figures in detail, FIG. 1 shows the process of the creation of source code 16 as performed by a developer 10 in accordance with an embodiment of the present invention. The developer 10 performs the action 12 of creating new source code 16. This action 12 creates a new raw source file 16 that is then stored inside a library system 14. The library system 14 makes a distinction between the raw source code 16 and metadata 18 for that raw source code 16. The metadata 18 in this instance is the component membership under which the source code 16 is categorized. The source code 16 has no knowledge of the metadata 18 and vice-versa.

The developer 10 performs the actions of storing source code 16 in the library 14 and storing metadata 18 in the library 14, the metadata 18 comprising a component membership for the source code 16. The library system 14 can be configured so that the developer 10 is forced to make a choice about the categorization of the source code 16 when the developer 10 loads the new source code 16 into the library 14. For example, a menu of choices can be presented to the developer 10, from which the developer 10 will make a selection, which will determine the category stored in the metadata 18.

Figure 2:
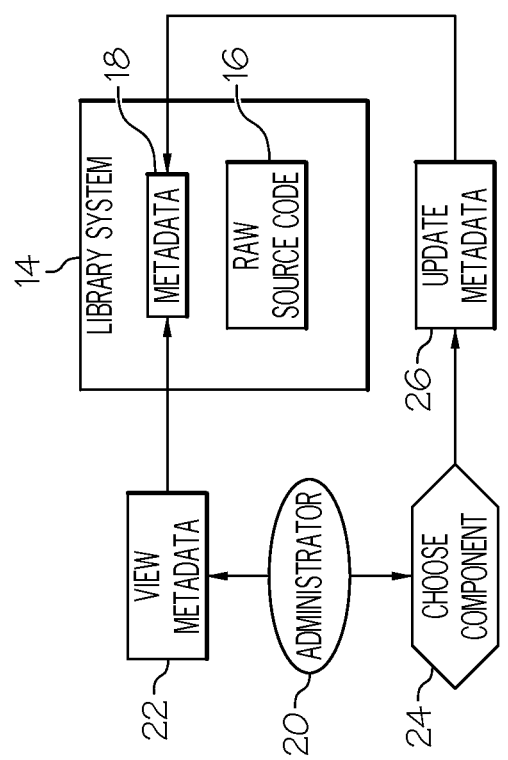
FIG. 2 is a schematic diagram of the updating of the metadata in accordance with an embodiment of the present invention.

FIG. 2 indicates how a suitably authorized library system administrator 20 (for example, a project leader or manager, etc.) can make changes to the metadata 18 without impacting the raw source code 16 in accordance with an embodiment of the present invention. The administrator 20, with the relevant access privileges, can perform the action 22 of viewing the metadata 18 that is stored within the library 14, for any and all of the stored source code 16. In this instance, the metadata 18 is the component which the administrator 20 will choose at action 24 and the specific source code 16 can be re-categorized, as desired, without any direct change being made to the source code 16.

In this way, the administrator 20 can perform the action 26 of updating the metadata 18 for any of the raw source code 16 stored within the library 14. This allows consistency within a software project to be maintained. Individual developers 10 may categorize their own source code 16 in a manner that does not fit with the overall structure of the project being created and therefore the administrator 20 has the facility to change the categorization that is stored by the metadata 18 for any individual pieces of source code 16. Categories can be created, merged and deleted by the administrator 20, reflecting changes to the component structure of the overall software system being built.

Figure 3:
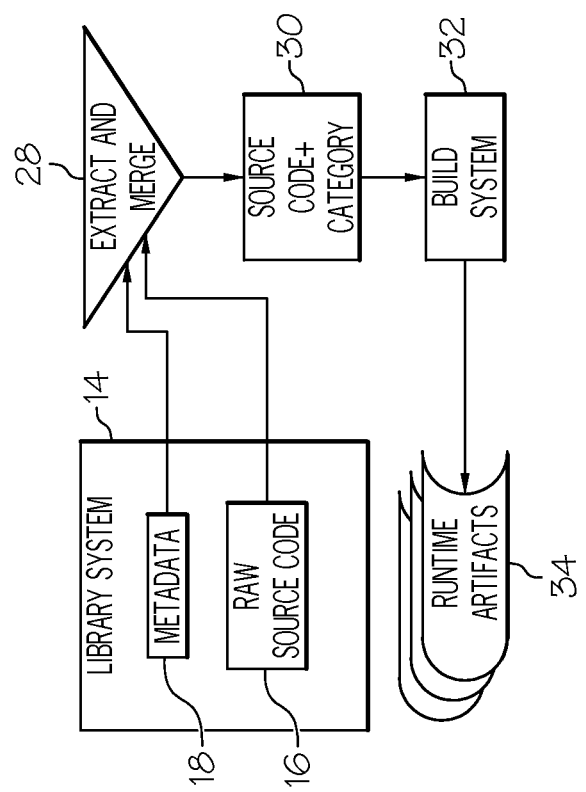
FIG. 3 is a schematic diagram of the creation of hardened source code from the original source code and associated metadata in accordance with an embodiment of the present invention.

FIG. 3 shows the process for taking the raw source code 16 and combining this source code 16 with the metadata 18 and producing a runtime artifact 34 in accordance with an embodiment of the present invention. A runtime artifact 34 is any tangible resource that might be read into memory by the runtime environment. Typically, this would be executable program code, but may also be a data resource used by the runtime system; for example, a message bundle. The raw source code 16 and the metadata 18 are both extracted from the library system 14, at which point the raw source code 16 is hardened by combining with the metadata 18 to form a compile unit 30, during the extraction and merging process 28. This can be done during extraction from the library system 14 or by a further process (not shown in the diagram). This creates the compile unit 30.

A build system 32 can then be used to transform the compile unit 30 into a runnable form, depending upon the nature of the software product being created. This could be a module, Java® class, an executable, etc., or the compile unit 30 itself may be executable, if it were a script for example. In this way, there is carried out the extracting of the source code 16 and metadata 18 from the library 14, the forming of a compile unit 30 from the extracted source code 16 and metadata 18, and the producing of runtime artifacts 34 from the compile unit 30 or an element derived from the compile unit 30.

Figure 4:
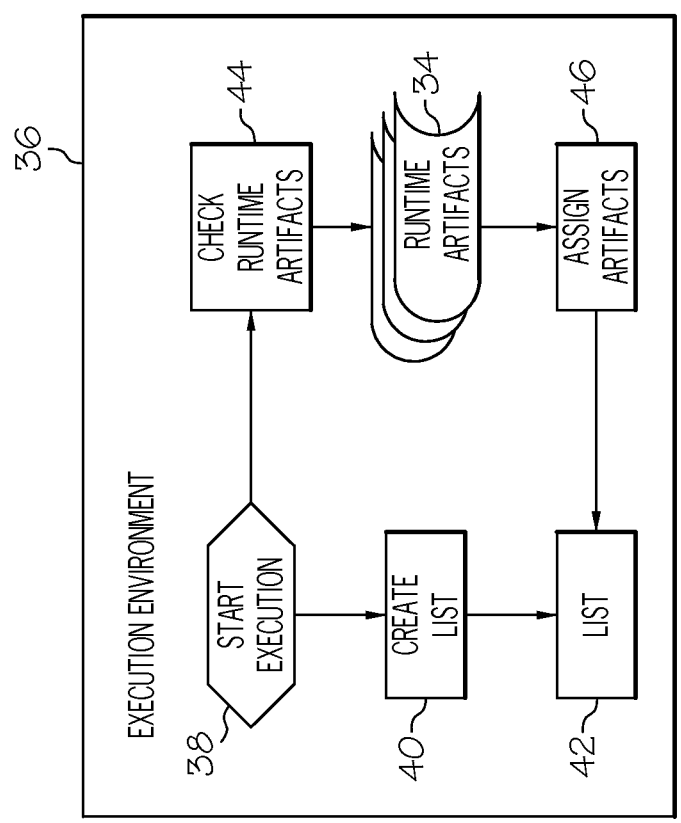
FIG. 4 is a schematic diagram illustrating the start-up procedure for an application implementing the componentized system in accordance with an embodiment of the present invention.

FIG. 4 illustrates the start-up procedure for an application implementing the componentized system in accordance with an embodiment of the present invention. An execution environment 36 is begun as shown by the start execution step 38. This triggers the action 40 which, as part of the initialization of the execution environment 36 creates an empty component list 42, which will record the assigned categories of the runtime artifacts 34. The execution environment 36 then proceeds to interrogate any runtime artifacts, as the action 44, which return the category. The execution environment 36 then associates that runtime artifact 34 with that particular component id, as the action 46, thereby populating the list 42.

The original categorization contained within the metadata 18 that has been hardened into the compile unit 30 will be obtained by the execution environment 38 and included in the component list 42. In this way, as the software operates, the categories of the individual elements that are created as runtime artifacts 34 are being discovered and recorded.

The following example shows how the described component model might be implemented using the Configuration Management Version Control (CMVC) library system with Java® source code. In this case, Java® class "MyClass" has been assigned to the component "MyComponent". The MyClass.java file is categorized in the library system as belonging to component "MyComponent". The source code stored in the library is:

```
Class MyClass {
    public static final String COMPONENT_ID="%W%";
    ...
}
``` where %W% is the source library variable for the component id, acting as a marker. When the source code is hardened with the component membership, the build source code is:

```
Class MyClass {
    public static final String COMPONENT_ID="MyComponent";
    ...
}
```

At runtime, the execution environment (acting as a diagnostic facility, for example) is able to determine component membership of class "MyClass" by analyzing the concrete value of string variable "COMPONENT_ID". This name of this string variable is a well-defined convention that is applied to all classes within the system. The string is a "public static final" string to ensure that it accessible to the execution environment and is non-modifiable.

Figure 5:
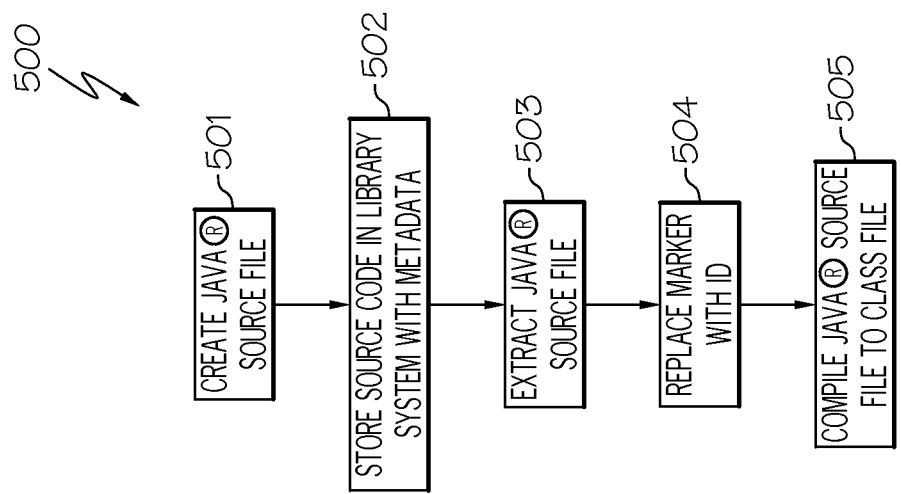
FIG. 5 is a flowchart of a method that represents a Java® implementation of the componentized system in accordance with an embodiment of the present invention.

FIG. 5 is a flowchart of a method 500 that represents a Java® implementation of the componentized system in accordance with an embodiment of the present invention. Referring to FIG. 5, in conjunction with FIGS. 1-4, at step 501, the developer 10 creates raw source code 16 including the marker of %W%, which acts as the metadata 18. The Java® source file contains the %W% metadata variable in a static COMPONENT_id string. At step 502, the developer 10 stores the source code 16 in a Configuration Management Version Control (CMVC) library system 14 with the metadata 18. The source code 16 and the metadata 18 are stored together in the library system 14. An administrator 20 can amend the metadata 18, if necessary.

During the build processing carried out by the build system 32 (converting the Java® file into a runtime artifact/JAVA class), the raw source file 16 is extracted from the CMVC (the library 14) at step 503 and then at step 504, the %W% marker is replaced with the component id from the metadata 18. At step 505, the build system compiles the Java® source file to a class file. In this way, the defined category is added to the final class file, which defines the component to which this class file is said to belong, in the context of the overall software system being built.

In some implementations, method 500 may include other and/or additional steps that, for clarity, are not depicted. Further, in some implementations, method 500 may be executed in a different order presented and that the order presented in the discussion of FIG. 5 is illustrative. Additionally, in some implementations, certain steps in method 500 may be executed in a substantially simultaneous manner or may be omitted.

Figure 6:
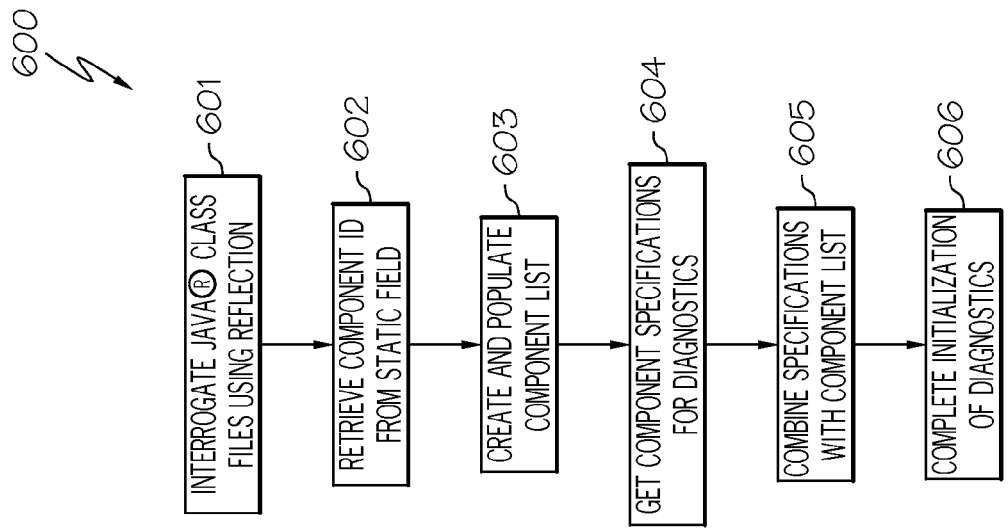
FIG. 6 is a flowchart of a method for a further implementation of the componentized system when used in Java® in accordance with an embodiment of the present invention.

FIG. 6 is a flowchart of a method 600 for a further implementation of the componentized system when used in Java® in accordance with an embodiment of the present invention. Referring to FIG. 6, in conjunction with FIGS. 1-4, during start-up, Java® reflection is used to determine a runtime artifact's component id (the category) and the product's diagnostic facility being configured to use componentization. After the product begins execution, at step 601, a startup module interrogates the Java® class files using reflection. At step 602, the module retrieves the component id from the COMPONENT_id static field. These component ids are used at step 603 to create and populate the component list. Therefore, all Java® class files that are loaded will have their categories determined by the module.

At step 604, the execution environment will get the component specifications for diagnostics. The diagnostic specification defines a subset of components to be included (or excluded) from diagnostic activities. The specification may be formed of specific components, wildcards to span multiple components or any combination. At step 605, there is performed the combining of the specifications with the components list, and, at step 606, there is completed the initialization of the diagnostic facility. An order of precedence between inclusion and exclusion is chosen by the implementation to handle any clashes in the diagnostic specification. The diagnostic specification is processed to set a diagnostic status (active or inactive) for each component.

In some implementations, method 600 may include other and/or additional steps that, for clarity, are not depicted. Further, in some implementations, method 600 may be executed in a different order presented and that the order presented in the discussion of FIG. 6 is illustrative. Additionally, in some implementations, certain steps in method 600 may be executed in a substantially simultaneous manner or may be omitted.

Figure 7:
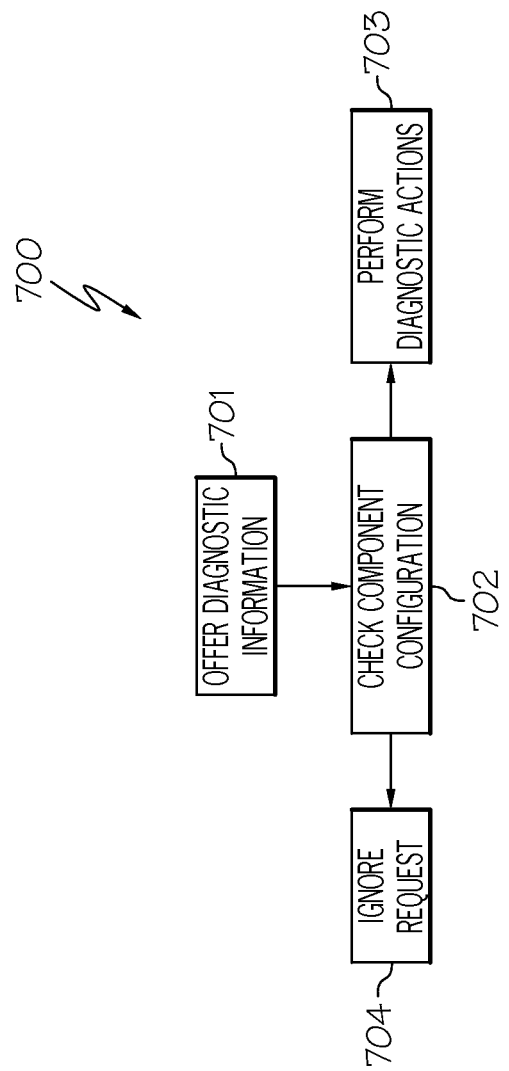
FIG. 7 is a flowchart of a method for a runtime artifact attempting to use the diagnostics and either failing or succeeding in accordance with an embodiment of the present invention.

FIG. 7 is a flowchart of a method 700 for a runtime artifact attempting to use the diagnostics and either failing (due to a componentization restriction) or succeeding in accordance with an embodiment of the present invention. Referring to FIG. 7, in conjunction with FIGS. 1-4, at step 701, the runtime artifact offers diagnostic information. At step 702, the diagnostic facility checks the component configuration, and either, at step 703, performs diagnostic actions, or, at step 704, ignores the request. When a run time artifact offers diagnostic information, a filter can then be applied based upon its component membership and the diagnostic status of that component. For example, code in Java® class MyClass, method MyMethod, calls the diagnostic facility with details of the time of execution, class name, method name, runtime thread id, and method parameter values. The diagnostic facility checks the component membership for MyClass and finds that it belongs to "MyComponent". The component list is then checked for the diagnostic status of "MyComponent". The diagnostic status for MyComponent is found to be active and so the diagnostic information is processed.

The component information that is returned by the interrogated runtime artifacts 34 and stored in the component list 42 is used in the above example for diagnostic purposes, but this is only one use of the information. The principal of the system is that the component categorizations of the interrogated runtime artifacts 34 are captured at runtime. This information could be used for testing or security purposes, for example. The important point about the system is that it delivers an effective and simple method by which the source code can be categorized into components and this is the basis for the assignment of the runtime artifacts to the software components, according to the original metadata stored in the library.

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

Figure 8:
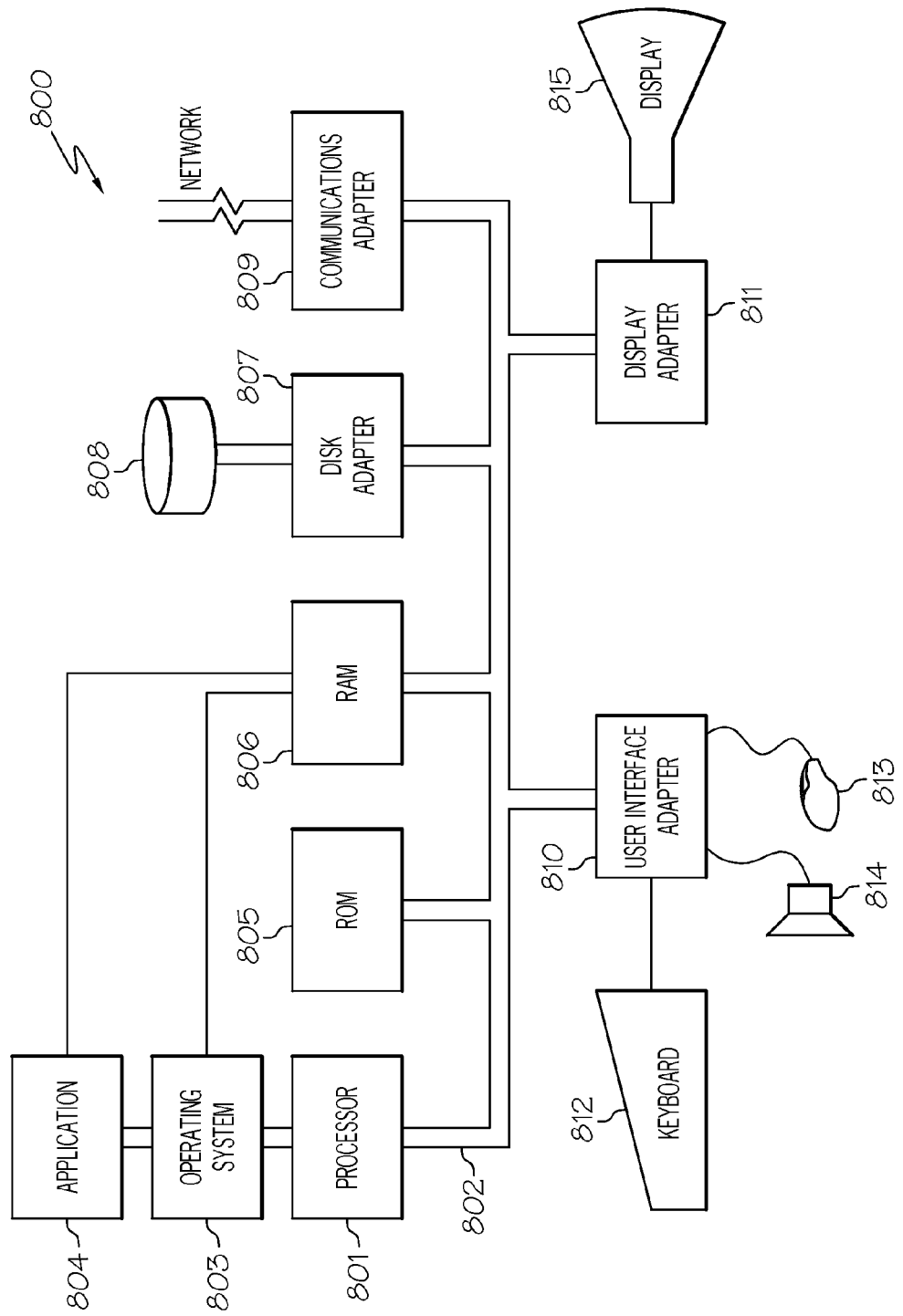
FIG. 8 depicts an embodiment of a hardware configuration of a computer system which is representative of a hardware environment for practicing the present invention.

FIG. 8 depicts an embodiment of a hardware configuration of a computer system 800 which is representative of a hardware environment for practicing the present invention. Referring to FIG. 8, computer system 800 has a processor 801 coupled to various other components by system bus 802. An operating system 803 may run on processor 801 and provide control and coordinate the functions of the various components of FIG. 8. An application 804 in accordance with the principles of the present invention may run in conjunction with operating system 803 and provide calls to operating system 803 where the calls implement the various functions or services to be performed by application 804. Application 804 may include, for example, an application for assigning runtime artifacts to software components as discussed above.

Referring again to FIG. 8, read-only memory ("ROM") 805 may be coupled to system bus 802 and include a basic input/output system ("BIOS") that controls certain basic functions of computer device 800. Random access memory ("RAM") 806 and disk adapter 807 may also be coupled to system bus 802. It should be noted that software components including operating system 803 and application 804 may be loaded into RAM 806, which may be computer system's 800 main memory for execution. Disk adapter 807 may be an integrated drive electronics ("IDE") adapter that communicates with a disk unit 808, e.g., disk drive.

Computer system 800 may further include a communications adapter 809 coupled to bus 802. Communications adapter 809 may interconnect bus 802 with an outside network (not shown) thereby allowing computer system 800 to communicate with other similar devices.

I/O devices may also be connected to computer system 800 via a user interface adapter 810 and a display adapter 811. Keyboard 812, mouse 813 and speaker 814 may all be interconnected to bus 802 through user interface adapter 810. Data may be inputted to computer system 800 through any of these devices. A display monitor 815 may be connected to system bus 802 by display adapter 811. In this manner, a user is capable of inputting to computer system 800 through keyboard 812 or mouse 813 and receiving output from computer system 800 via display 815 or speaker 814.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of assigning runtime artifacts to software components, the method comprising:
    extracting source code and metadata from a library, the metadata comprising a component membership for the source code;
    forming a compile unit from the extracted source code and metadata;
    producing runtime artifacts from the compile unit or an element derived from the compile unit;
    interrogating, by a processor, each runtime artifact to determine a defined component for the each runtime artifact; and
    recording the determined component.

2. A method according to claim 1 further comprising:
    receiving a defined user input relating to the metadata comprising the component membership for the source code; and
    changing the component membership according to the defined user input without changing the source code.

3. A method according to claim 1, wherein the extracting of the source code and metadata from the library and the forming of the compile unit from the extracted source code and metadata are performed as a single process step.

4. A method according to claim 1 further comprising:
    transforming the compile unit into an executable form, wherein the element derived from the compile unit which produces the runtime artifacts comprises the executable form.

5. A method according to claim 1 further comprising:
    prior to interrogating the each runtime artifact, starting an execution environment and creating a component list, wherein the recording of the determined component comprises recording the components in the component list.

* * * * *